United States Patent Office 3,636,019
Patented Jan. 18, 1972

3,636,019
ZIEGLER POLYMERIZATION CATALYSTS
Philippe Mornet, Pau, Jean Teitgen, Arthez-de-Bearn, and Gilbert Marie, Pau, France, assignors to Société Nationale des Petroles d'Aquitaine, Tour d'Aquitaine, Courbevoie, France
No Drawing. Filed Aug. 7, 1968, Ser. No. 750,758
Claims priority, application France, Aug. 9, 1967, 117,337
Int. Cl. C08f 15/04
U.S. Cl. 252—429 B
7 Claims

ABSTRACT OF THE DISCLOSURE

Alkoxy alkyl halosulphites and halosulphates are used as activators for Ziegler-type polymerization catalysts wherein the transition metal compound is preferably a vanadium compound and the organoaluminum is preferably a haloaluminum alkyl.

RELATED APPLICATIONS

This application claims priority from French application 117,337 filed Aug. 9, 1967.

FIELD OF THE INVENTION

Catalysts of polymerizing olefines.

DESCRIPTION OF THE PRIOR ART

From the works of Karl Ziegler, it is known to obtain polymers, copolymers and terpolymers of olefines and/or dienes, using catalysts which comprise a compound of the transition metals of the Groups IV to VI of the Periodic System, for example titanium or vanadium, in addition to a reducing agent, for example, an organic aluminum compound. It is particularly the halogenated derivatives of the said titanium or vanadium which are used, while it is the aluminum alkyl halides which are preferred as reducing agent. There are also known similar catalysts, but modified to a greater or lesser degree, containing particularity other organometallic compounds for example, those of tin, and an aluminium halide. The catalysts can possibly be fixed on appropriate supports. In all these cases, because of the presence of the metallic compounds in the reaction medium, the polymers which are obtained contain metallic constituents. These latter, even when present in fairly small contents, affect the physical properties, the resistance to oxidation under heat, the electrical resistivity and other desired qualities of the polymers. In order to overcome this disadvantage, it is obligatory to reduce the quantity of necessary metallic catalyst, while maintaining a high polymerisation velocity; more active catalysts or activators of already known catalysts have thus been investigated. Thus, various catalysts have been proposed, and at the present time several substances are known, of which the addition to the Ziegler catalyst systems permits the period of activity of these systems to be prolonged. Such products are, for example, organic azo and organic azoxy compounds, halogenated, cyclic or acyclic hydrocarbons, which may or may not be saturated, quinones, and benzene sulphonyl chloride. Pentachlorethane has been proposed as halogenated hydrocarbons; however, this latter only insignificantly increases the polymerisation yield.

On the contrary, it is possible by the process according to the invention to reactivate the Ziegler or similar catalyst, to obtain solutions with relatively large contents of solid materials and to improve the polymerisation yield, all while reducing the quantity of metallic constituents present in the polymer, which are prejudicial to the properties of this latter.

SUMMARY OF THE INVENTION

The process for polymerising olefines and/or dienes according to the invention, of the type in which the monomers are caused to react in the presence of a catalyst composition comprising a reducing agent, such as an organic compound of aluminium and/or another metal, and a compound of transition metal of the Groups IV to VI of the Periodic Table of the Elements, is characterised in that the reaction medium has added thereto an activator chosen from the halosulphites of alkoxy alkyls and/or the halosulphates of alkoxy alkyls.

The activator according to the invention can be represented by the formula $$R^1-O-R^2-O-SO_nX \qquad (I)$$

in which $n$ is an integer equal to 1 or 2, $R_1$ and $R_2$ are alkyl radicals and X is a halogen atom, more particularly chlorine or bromine.

By the term "polymerisation," there is also understood here a homopolymerisation as well as a copolymisation, especially a terpolymerisation.

The process of the invention is applicable with success to all the polymerisation reactions of olefines and dienes, and especially to the preparation of polyethylene, ethylene-propylene and ethylene-propylene-diene polymers.

The chlorides of Formula I can easily be prepared by causing an ether alcohol of formula $R^1-O-R^2-OH$ to react either with sulphuryl chloride ($SO_2Cl_2$) in order to obtain an alkoxy alkyl chlorosulphate ($n=2$), or with thionyl chloride ($SOCl_2$), in order to obtain an alkoxy alkyl chlorosulphite ($n=1$).

DESCRIPTION OF THE PREFERRED EMBODIMENTS

In the activators of the present invention, $R^1$ and $R^2$ are preferably lower alkyl radicals, of which the number of carbon atoms is, for example, from one to twelve. Particularly good results have been obtained with linear lower alkyl radicals, such as methyl, ethyl, propyl, butyl, etc. As non-limiting examples of activators according to the invention, there may be mentioned ethoxyethyl chlorosulphite ($C_2H_5-O-C_2H_4-O-SOCl$), ethoxyethyl chlorosulphate, methoxybutyl chlorosulphate $$(CH_3-O-C_4H_8-O-SO_2Cl)$$

etc.

The process of the invention is particularly effective when the Ziegler catalyst contains a compound of titanium and especially of vanadium.

Among the compounds of these latter metals, it is the halides and the oxyhalides which are best suited for carrying into effect the pocess of the invention, although other compounds of these metals can be used.

As reducing agent, it is advantageous to employ an organic aluminium compound, particularly an aluminium alkyl or better still an aluminium alkyl halide. However, it is understood that the process of the invention is also applicable in the case where the reducing agent is chosen from other reducing products, which are appropriate for carrying out the Ziegler polymerisation process.

The quantities of activator which are used can vary within wide limits, but it is necessary for the reaction medium to contain more organic aluminium compound, expressed as metallic aluminium, than activator.

More especially about 5 to 50 moles and preferably from about 10 to 20 moles of activator can be used per atom of transition metal, i.e. titanium or vanadium.

The conditions which are most favourable to the beneficial action of the activator are those where the two fundamental constituents of the Ziegler catalyst are present in quantities which permit of obtaining an Al/V or Al/Ti ratio of approximately 40/1 to 50/1, and this ratio should not be lower than about 10/1.

The constituents of the catalyst and the activator can be used in various ways; by initially mixing them before they are introduced into the reaction mixture, or by introducing them directy into said mixture, for example, continuously, or even by initially mixing the salts of vanadium or titanium and the activator.

The polymerisation is effected in a suitable solvent and particularly in one or more possibly halogenated hydrocarbons: as non-limiting examples, it is possible to mention hexane, heptane, octane, cyclohexane, benzene, trichloroethylene, ethyl chloride, etc.

The polymerisation temperature can vary within wide limits, for example, between −50 and +100° C., but it will preferably be contained between −5 and +60° C.

The polymerisation can be effected either at atmospheric pressure, or under higher pressures, for example, pressures which are between 1 and 20 kg./cm.$^2$.

The polymerisation can be conducted intermittently or continuously.

EXAMPLE 1

This example is given as a standard reaction for comparison purposes.

In a reactor with a capacity of one litre, equipped with a condenser, a spiral agitator, a thermometer tube, a tube for the introduction of gas below the surface of the liquid, a dropping funnel with cocks for the introduction of the activator solution and a dropping funnel for introducing the constituents of the preformed Ziegler catalyst, 700 ml. of purified cyclohexane are saturated for 20 minutes at atmospheric pressure by means of a filling which comprises 33 mol% of ethylene and 66 mol% of propylene, both being very pure. The total delivery of the gases is 100 litres per hour. Without interrupting the introduction of the monomers, there is added the catalyst, which is formed from 0.1 millimole of VOCl$_3$ and 5 millimoles of aluminium ethyl sesquichloride. A rise in temperature is noted.

After polymerising for 20 minutes, absorption of gas is no longer observed; a few ml. of ethanol are then added in order to destroy the remaining catalyst. The polymer is precipitated by means of an ethanol-acetone solution and the product obtained is dried at 60° C. in vacuo until the weight is constant. The weight of polymer thus collected is 6.3 g., this corresponding to an efficiency of 350 g. of polymer per g. of VOCl$_3$.

EXAMPLE 2

In a 1-litre reactor, 800 ml. of cyclohexane are saturated at atmospheric pressure with a gaseous mixture which is supplied at the rate of 60 litres per hour of propylene and 40 litres per hour of ethylene, for 20 minutes. When the medium is saturated, 0.1 millimole of VOCl$_3$ and 5 millimoles of ethyl aluminium sesquichloride are introduced; without interrupting the arrival of the monomers, 1 millimole of methoxybutyl chlorosulphate is added dropwise in 25 minutes. The temperature is raised from 23° to 33° C. The polymerization is continued for 50 minutes, that is to say, until the absorption of the gases has ended. The weight of polymer obtained is 19.1 g., which corresponds to an efficiency of 1100 g. per g. of VOCl$_3$.

EXAMPLE 3

The operations of Example 2 are repeated, but the deliveries of the gases are 60 litres per hour for ethylene and 70 litres per hour for propylene.

0.1 millimole of vanadium acetyl acetonate and 2 millimoles of ethyl aluminum sesquichloride are introduced when the saturation is terminated.

Then, 6 millimoles of ethyl aluminium sesquichloride and 2.5 millimoles of ethoxy ethyl chlorosulphate are introduced dropwise for 15 minutes.

The polymerisation is extended until completion of the absorption of the gases, for 50 minutes.

The weight of polymer obtained (27.5 g.) shows the efficiency to be 790 g. of polymer per g. of vanadium acetyl acetonate.

The polymer contains 55.7% of ethylene groups; its Mooney viscosity is 36.

EXAMPLE 4

In a 5-liter reactor containing 3.5 litres of purified cyclohexane, a polymerisation process is carried out in accordance with the general procedure of the foregoing examples: the saturation lasts 20 minutes with deliveries of 60 litres per hour for ethylene and 90 litres per hour for propylene.
with retaoin Without stopping the flow of the gases, 0.7 millimole of VOCl$_3$ and 3.5 millimoles of ethyl aluminium sesquichloride are introduced and then 3.5 millimoles of ethoxy butyl chlorosulphate and 10.5 millimoles of aluminium sesquichloride are introduced for 20 minutes, dropwise and separately.

The polymerisation lasts 1 hour, and yields 120 g. of a polymer containing 52.5% of ethylene groups, 0.12% of ash; the Mooney viscosity (ML4) is 36. The efficiency is shown to be 999 g. of polymer for 1 g. of VOCl$_3$.

EXAMPLE 5

The continuous polymerisation is carried out in a 20-litre reactor, containing 16 litres of purified cyclohexane. The continuous rate of flow of the solvent is 12 l./h.

At the start, there are introduced 0.1 millimole of VOCl$_3$ per litre of solvent and 3 millimoles of ethyl aluminium sesquichloride. The absorption is 550 l./h. of propylene-ethylene mixture. The supply of vanadium is reduced to 0.07 millimole of VOCl$_3$ per litre of solvent and 0.7 millimole of ethoxy ethyl chlorosulphate is added per litre for 1½ hours. The absorption is 620 litres of gas per hour.

The addition of vanadium is increased to 0.14 millimole of VOCl$_3$ per litre of solvent, the other conditions remaining the same; the absorption is then 520 litres of propylene-ethylene mixture per hour.

We claim:
1. A novel catalyst system for polymerization of olefins comprising
    (a) a compound of a transition metal selected from the group consisting of vanadium halide, vanadium oxyhalide and mixtures thereof,
    (b) a haloaluminium alkyl,
    (c) about 5 to 50 moles per gram atom of transition metal of an activator,
selected from the group consisting of an alkoxy alkyl halosulphite, an alkoxy alkyl halosulphate and a mixture of such a halosulphite and such a halosulphate, and wherein the atomic ratio of aluminium to transition metal is at least about 10:1.

2. A catalyst system according to claim 1 wherein the alkyl and alkoxy moieties of the activator individually contain from 1–12 carbon atoms and the halo moiety thereof is chloride.

3. A catalyst system according to claim 2 wherein the activator has the formula $R^1-O-R^2-O=SO_nX$, $n$ is 1 or 2, $R^1$ and $R^2$ are alkyl and X is halogen.

4. A catalyst system according to claim 3 wherein the atomic ratio of aluminium to transition metal is 40:1 to 50:1, X is chlorine or bromine, and $R^1$ and $R^2$ are alkyl of 1 to 12 carbon atoms.

5. A catalyst system according to claim 4 wherein the activator is methoxybutyl chlorosulphate.

6. A catalyst system according to claim 4 wherein the activator is ethoxy ethyl chlorosulphate.

7. A catalyst system according to claim 4 wherein the activator is ethoxy butyl chlorosulphate.

References Cited

UNITED STATES PATENTS

| | | | |
|---|---|---|---|
| 3,317,499 | 5/1967 | Nakaguchi et al. | 252—429 B X |
| 3,328,366 | 6/1967 | Nakaguchi et al. | 252—429 B X |
| 3,380,930 | 4/1968 | Miller | 252—429 B |

PATRICK P. GARVIN, Primary Examiner

U.S. Cl. X.R.

252—431 R; 260—88.2, 85.3, 94.9 C, 94.4